(12) United States Patent
Hirano et al.

(10) Patent No.: US 6,685,901 B2
(45) Date of Patent: Feb. 3, 2004

(54) METHOD FOR REMOVING A HALOGEN SERIES GAS

(75) Inventors: Hachiro Hirano, Tokyo (JP); Yoichi Mori, Kitakyushu (JP); Yoshikatsu Kawabe, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 260 days.

(21) Appl. No.: 09/986,587

(22) Filed: Nov. 9, 2001

(65) Prior Publication Data

US 2002/0068032 A1 Jun. 6, 2002

(30) Foreign Application Priority Data

| | | |
|---|---|---|
| Nov. 10, 2000 | (JP) | 2000-343696 |
| Apr. 23, 2001 | (JP) | 2001-124231 |
| Apr. 23, 2001 | (JP) | 2001-124232 |
| Jun. 29, 2001 | (JP) | 2001-198649 |
| Jul. 4, 2001 | (JP) | 2001-202977 |

(51) Int. Cl.$^7$ ................................................ A62D 3/00
(52) U.S. Cl. ...................................................... 423/240 S
(58) Field of Search ......................... 423/240 R, 240 S; 588/206, 248

(56) References Cited

U.S. PATENT DOCUMENTS

| 5,897,845 A | 4/1999 | Denny et al. |
| 6,352,653 B1 | 3/2002 | Hirano et al. |

FOREIGN PATENT DOCUMENTS

| WO | WO 99/39819 | 8/1999 |

*Primary Examiner*—Stanley S. Silverman
*Assistant Examiner*—Edward M. Johnson
(74) *Attorney, Agent, or Firm*—Oblon, Spivak, McClelland, Maier & Neustadt, P.C.

(57) ABSTRACT

A method is provided for removing a halogen series gas, by bringing a halogen series gas into contact with a granulated product, the granulated product being obtainable by granulating, employing various methods including compression molding, extrusion molding, rotating granulation and agitation granulation, a powder of hydrogencarbonate having a mean particle diameter of primary particles 10–500 $\mu$m, wherein the granulated product has a mean particle diameter of 0.5–20 mm and a minimum average hardness that is dependent on the mean particle diameter.

18 Claims, No Drawings

METHOD FOR REMOVING A HALOGEN SERIES GAS

The present invention relates to a method for removing a halogen series gas comprising a halogen element or a halogen compound. It relates to a method for removing a halogen series gas from e.g. dry etching exhaust gas containing a halogen series gas for example.

Conventionally, as a method of treating e.g. dry etching exhaust gas or an exhaust gas from a CVD (chemical vapor deposition) chamber containing a halogen series gas comprising a halogen element or a halogen compound, a treatment method by dry process employing an adsorbent such as activated carbon has been employed in order to miniaturize equipments and to simplify operation. However, there are drawbacks such as firing due to heat of adsorption during gas adsorption, odor of a used adsorbent and making a solid waste residue.

In consideration of these circumstances, it is an object of the present invention to provide a method for removing a halogen series gas, which suppresses firing of an adsorbent, which has a high performance of treating a halogen series gas, and which reduces odor of a used adsorbent and making a solid waste residue.

The present invention provides a method for removing a halogen series gas, which comprises bringing a halogen series gas comprising a halogen element or a halogen compound into contact with a granulated product, wherein the granulated product is obtained by granulating a powder of a hydrogencarbonate having a mean particle diameter of primary particles of from 10 to 500 $\mu$m, and has a mean particle diameter of from 0.5 to 20 mm and an average hardness as defined below:

in a case where the granulated product has a mean particle diameter of at least 0.5 mm and less than 1.0 mm, the average hardness of granulated product particles having particle diameters of at least 0.5 mm and less than 1.0 mm is at least 1 N;
  in a case where the granulated product has a mean particle diameter of at least 1.0 mm and less than 1.5 mm, the average hardness of granulated product particles having particle diameters of at least 1.0 mm and less than 1.5 mm is at least 4 N;
  in a case where the granulated product has a mean particle diameter of at least 1.5 mm and less than 2.0 mm, the average hardness of granulated product particles having particle diameters of at least 1.5 mm and less than 2.0 mm is at least 10 N; and
  in a case where the granulated product has a mean particle diameter of from 2.0 mm to 20 mm, the average hardness of granulated product particles having particle diameters of at least 2.0 mm is at least 30 N.

Now, the present invention will be described in detail with reference to the preferred embodiments.

In the present invention, as the hydrogencarbonate, sodium hydrogencarbonate or potassium hydrogencarbonate may, for example, be used. Particularly preferred is sodium hydrogencarbonate since it can be available in large quantities at a low cost and it is thereby suitable for industrial use, and it has no hygroscopicity, such being convenience for production and preservation of a granulated product. On the other hand, potassium hydrogencarbonate is preferred in a case where inclusion of sodium in e.g. an exhaust gas after the removal treatment has to be prevented.

In the present invention, a powder of the hydrogencarbonate is formed into a granulated product. The granulated product preferably contains the hydrogencarbonate in an amount of at least 70 mass %. If the hydrogencarbonate is less than 70 mass % in the granulated product, a gas removal capacity as a halogen series gas removing agent tends to decrease, whereby a removing agent packed bed has to be renewed frequently. The content of the hydrogencarbonate is particularly preferably at least 80 mass %. Here, as another material which may be contained in the granulated product, an adsorbent other than a hydrogencarbonate or a binder may, for example, be mentioned.

In the present invention, as the powder of a hydrogencarbonate, one having a mean particle diameter of primary particles of from 10 to 500 $\mu$m is used, in view of easiness in granulation and availability in an industrial scale. If the mean particle diameter of primary particles is less than 10 $\mu$m, flowability tends to be poor and operation such as particle handling tends to be difficult. If it exceeds 500 $\mu$m, production of such a granulated product tends to be technically difficult, thus causing increase in cost. Here, primary particles are single crystals of a hydrogencarbonate, and the mean particle diameter is a mean particle diameter on the basis of mass.

In the present invention, the mean particle diameter of the granulated product of the powder of a hydrogencarbonate is from 0.5 to 20 mm. When the mean particle diameter of the granulated product is from 0.5 to 20 mm, a conventionally used packed tower or the like can be used during treatment of a halogen series gas. If the mean particle diameter of the granulated product is less than 0.5 mm, pressure drop tends to be high when a halogen series gas or a gas to be treated containing it passes through e.g. a packed bed. If the mean particle diameter exceeds 20 mm, the contact area of the granulated product with the gas to be treated tends to decrease, thus decreasing an exhaust gas removal performance. The mean particle diameter of the granulated product is particularly preferably from 0.5 to 10 mm.

In the present invention, the mean particle diameter of the granulated product is measured as follows. Sieves having sieve openings within ranges fit for the particle diameters of the granulated product are overlaid on top of one another, a bottom tray is disposed at the basement, and the granulated product is sprinkled on the top sieve, followed by shaking by a Ro-Tap Sieve Shaker. Then, a mass of oversize particles remaining on each standard sieve is measured, a cumulative mass of the oversize particles on each of the sieves having the respective sieve opening values is shown by a line graph, and the particle diameter when the cumulative mass of the oversize particles is 50% is taken as the mean particle diameter. As the difference in the sieve opening between adjacent sieves, a pitch of 0.5 mm is preferably employed, although it depends on the particle diameters of the granulated product.

In the present invention, the granulated product can be obtained by various methods such as compression molding, extrusion molding, rotating granulation and agitation granulation. Here, compression molding is particularly preferred since steps are simple and can be carried out industrially easily, and the granulated product can be obtained without using a binder, and further, a granulated product having a high hardness and is less likely to break, which has a large gas treatment capacity, can be obtained.

As a method to obtain the granulated product, a method of carrying out molding by dry process by using a compression molding machine, followed by coarse crushing and sieving may, for example, be mentioned. Further, a method of carrying out molding by a wet type granulating machine by using a water-soluble binder, followed by drying, may also be mentioned.

In the present invention, in a case where the granulated product of the powder of a hydrogencarbonate is packed in a packed bed to treat a halogen series gas, if the strength is low, the granulated product tends to be powdered and the pressure drop tends to increase when the halogen series gas is passed through the packed bed in some cases. Accordingly, the strength of the granulated product is made high.

As a method of evaluating the strength of the granulated product in the present invention, hardness may be mentioned. Here, the hardness is a force which is required to break one particle of the granulated product by vertically applying a load from above for compression.

The method of evaluating hardness in the present invention is carried out with respect to a group of particles having uniform particle diameters, obtained by classifying particles of the granulated product depending upon the mean particle diameter. For example, with respect to the granulated product having a mean particle diameter of at least 1.5 mm and less than 2.0 mm, a sieve having a sieve opening of 1.5 mm and a sieve having a sieve opening of 2.0 mm are used for sieving to collect twenty particles which are on the sieve having a sieve opening of 1.5 mm and below the sieve having a sieve opening of 2.0 mm, and hardness of each particle is measured to take the average value thereof as a central value (hereinafter referred to as an average hardness) for the particle strength.

As a preferred hardness of the granulated product of the powder of a hydrogencarbonate in the present invention, in a case where the granulated product has a mean particle diameter of at least 0.5 mm and less than 1.0 mm, the average hardness of granulated product particles having particle diameters of at least 0.5 mm and less than 1.0 mm is at least 1 N; in a case where the granulated product has a mean particle diameter of at least 1.0 mm and less than 1.5 mm, the average hardness of granulated product particles having particle diameters of at least 1.0 mm and less than 1.5 mm is at least 4 N; in a case where the granulated product has a mean particle diameter of at least 1.5 mm and less than 2.0 mm, the average hardness of granulated product particles having particle diameters of at least 1.5 mm and less than 2.0 mm is at least 10 N; and in a case where the granulated product has a mean particle diameter of from 2.0 mm to 20 mm, the average hardness of granulated product particles having particle diameters of at least 2.0 mm is at least 30 N.

In the present invention, a halogen series gas comprising a halogen element or a halogen compound (hereinafter referred to as the present halogen series gas) is removed. For example, e.g. a dry etching exhaust gas containing the present halogen series gas is treated to remove the halogen series gas in said exhaust gas. As the halogen, fluorine, chlorine, bromine or iodine may, for example, be mentioned. Specifically, as the present halogen series gas, one member or at least two members selected from the group consisting of $BCl_3$, $CCl_4$, $Cl_2$, $Br_2$, $I_2$, $SiCl_4$, HCl, $COCl_2$, $F_2$, $SiF_4$, HF, $COF_2$, $NF_3$, $WF_6$, $ClF_3$ and HBr may be mentioned.

In the present invention, the temperature of the present halogen series gas is preferably at least 40° C. and less than 80° C., whereby reactivity of the granulated product can be increased, the removal treatment can be carried out efficiency, and the effect of the granulated product will last for a long period of time. The temperature of the present halogen series gas itself may be made at least 40° C. and less than 80° C., or the temperature of e.g. a packed tower in which the granulated product is packed may be set to at least 40° C. and less than 80° C. If the temperature of the present halogen series gas is less than 40° C., the reaction rate tends to decrease. Further, if it exceeds 80° C., equipments such as a packed bed have to be made of an expensive heat resistant material or have to have a heat resistant structure, and operation tends to be difficult. The temperature of the present halogen series gas is particularly preferably at least 50° C. and less than 70° C.

In the present invention, the hydrogencarbonate reacts with a halogen element or a halogen compound to form a water-soluble salt. Since the hydrogencarbonate itself is water soluble, the granulated product after used for removal of the halogen series gas in an exhaust gas can be dissolved in water. Further, as mentioned hereinafter, a solid waste product can be decreased in a case where activated carbon is used together with the hydrogencarbonate, for example.

Since the hydrogencarbonate reacts with a halogen element or a halogen compound in the present halogen series gas to form a water-soluble salt, no odor may be generated, which is caused by desorption of a halogen element or a halogen compound as in a case of adsorption by activated carbon, and accordingly renewal operation of e.g. a packed bed can be carried out easily. Further, the hydrogencarbonate itself has fire-extinguishing properties, whereby there is no danger of firing.

In the present invention, it is also preferred to pack the granulated product in a column such as a packed tower together with activated carbon and to bring the present halogen series gas into contact therewith to remove the present halogen series gas. By such a method, not only removal amount of the halogen element or halogen compound can be increased, but also generation of odor from activated carbon can be decreased, as compared with a case where activated carbon alone is used. Specifically, a method of disposing the hydrogencarbonate and activated carbon in a layer structure in a column such as a packed tower may, for example, be mentioned.

Specific Halogen Series Gas

In a case where the present halogen series gas is a halogen series gas containing at least one member selected from the group consisting of $Cl_2$, $Br_2$ and $I_2$ (hereinafter referred to as specific halogen series gas), the following three methods for removing the specific halogen series gas may be mentioned.

The specific halogen series gas may contain, in addition to a halogen element containing at least one member selected from the group consisting of $Cl_2$, $Br_2$ and $I_2$, at least one halogen compound selected from the group consisting of $BCl_3$, $CCl_4$, $SiCl_4$, HCl, $COCl_2$, $SiF_4$, HF, $COF_2$, $F_2$, $NF_3$, $WF_6$, $ClF_3$ and HBr, and it may contain, in addition to a halogen element and a halogen compound, another gas, and it may contain e.g. an inert gas (such as argon gas or $N_2$ gas), $O_2$ gas, air, $CO_2$ gas or $H_2O$ gas.

(1) Addition of Acid Gas

To the specific halogen series gas, at least one acid gas selected from the group consisting of hydrogen chloride, hydrogen fluoride, hydrogen bromide and hydrogen iodide (hereinafter referred to as specific acid gas) may be added and brought into contact with the granulated product of a hydrogencarbonate, whereby reactivity of the hydrogencarbonate can be further improved, and the effect can be made to last for a longer period of time.

The addition amount of the specific acid gas is preferably from 1 to 100 vol % based on the total amount of the specific halogen gas under the same pressure at the same temperature. If the addition amount is less than 1 vol %, no adequate effect of addition of the specific acid gas can be obtained. Further, if the addition amount exceeds 100 vol %, no further improvement in reactivity of the hydrogencarbonate can be confirmed, and an unnecessary amount of the specific acid gas may be used, and further, the hydrogencarbonate is consumed by reaction with the specific acid gas, and the capacity to remove the present halogen gas tends to decrease. A more preferred addition amount is from 1 to 80 vol %.

Here, as a method of adding the specific acid gas to the specific halogen series gas to bring the specific acid gas into contact with the granulated product of a hydrogencarbonate, the specific acid gas may be preliminarily added to the specific halogen series gas, followed by mixing, and then the mixture may be brought into contact with the hydrogencarbonate, or the specific acid gas may be brought into contact with the hydrogencarbonate when the specific halogen series gas is brought into contact with the hydrogencarbonate. Otherwise, in a case where the boiling point of the specific halogen series gas or the specific acid gas is high, they are brought into contact with the hydrogencarbonate preferably in a gas state by raising the temperature during contact or by diluting them with another gas.

Addition of the specific acid gas to the specific halogen series gas improves reactivity of the hydrogencarbonate with the specific halogen series gas, and a larger amount of the specific halogen series gas can be removed when the same amount of the hydrogencarbonate is used.

Although the mechanism is not clearly understood, it is considered that the added specific acid gas accelerates decomposition of a hypohalogenous acid salt formed due to reaction of $Cl_2$, $Br_2$ or $I_2$ with the hydrogencarbonate. Usually, when $Cl_2$, $Br_2$ or $I_2$ reacts with a hydrogencarbonate, a hypohalogenous acid salt is formed in accordance with the formula 1. In a case where sodium hydrogencarbonate is employed as the hydrogencarbonate, the formed hypohalogenous acid salt is known to decompose into sodium halide and oxygen in accordance with the formula 2. However, it is considered that, in a case where the hypohalogenous acid salt does not undergo decomposition and remains, the reaction of the hydrogencarbonate with $Cl_2$, $Br_2$ or $I_2$ is less likely to proceed and reach a state of equilibrium.

In the present invention, it is considered that by addition of the specific acid gas, the specific acid gas (such as HX) decomposes the hypohalogenous acid salt into a halide and a hypohalogenous acid in accordance with the formula 3, whereby the removal efficiency of the specific halogen series gas increases. Here, the hypohalogenous acid is known to quickly decompose into hydrogen halide and oxygen in accordance with the formula 4.

$$NaHCO_3 + X_2 \rightarrow NaXO + CO_2 + HX \qquad \text{Formula 1}$$

(X=Cl, Br or I)

$$NaXO \rightarrow NaX + 1/2 O_2 \qquad \text{Formula 2}$$

$$NaXO + HX \rightarrow NaX + HXO \qquad \text{Formula 3}$$

$$HXO \rightarrow HX + 1/2 O_2 \qquad \text{Formula 4}$$

In the present invention, it is also preferred to pack the granulated product of a hydrogencarbonate in a container such as a packed tower together with activated carbon and to bring the present halogen gas-containing gas having the specific acid gas added thereto into contact therewith to remove the present halogen gas. By this method, not only the removal amount of the present halogen gas can be increased, but also generation of odor from activated carbon can be decreased as compared with a case where activated carbon alone is used. Specifically, a method of disposing the granulated product of a hydrogencarbonate and activated carbon in a layer structure as packed beds in a container such as a packed tower may be mentioned.

(2) Installation of a Catalyst Layer

In the present invention, it is preferred to pack a catalyst containing at least one element selected from the group consisting of Pd, Fe, Ni, Co, Mn and Cu (hereinafter referred to as specific metal element) in a hollow cylindrical container (column) to form a catalyst layer, to pack the granulated product of a hydrogencarbonate adjacent to the catalyst layer to form a granulated product layer, and to make the specific halogen series gas flow through the catalyst layer first and then flow through the granulated product layer. A space or a perforated plate as a partition panel may be provided between the catalyst layer and the granulated product layer. The catalyst layer can be used repeatedly, whereas the capacity to treat the specific halogen series gas of the granulated product layer disappears in a relatively short period of time as compared with the catalyst layer, and accordingly it may be favorable to provide a space or a partition panel when the exhaust granulated product is renewed in some cases. However, from a practical viewpoint, there is no problem to form the granulated product layer to be in contact with the catalyst layer without providing such a space or a partition panel. In the present invention, the catalyst layer is effective for increasing reactivity of the granulated product layer to increase utilization efficiency of the granulated product layer, and from such a viewpoint, it is also preferred that the catalyst layer and the granulated product layer are in contact with each other.

As the catalyst containing the specific metal element, preferred is a catalyst having the specific metal element supported by a carrier (such as activated carbon, zeolite or silica gel). The specific metal element in the catalyst is present preferably in a state of a metal element but it may be present in a state of a metal compound or in a state of a mixture of a metal element with a metal compound.

The content of the specific metal element in the catalyst layer is preferably from 0.0001 to 10% (proportion of the mass of the total specific metal elements as calculated as metal elements based on the total catalyst mass). If the content is less than 0.0001%, no adequate effect to improve reactivity of the granulated product layer can be obtained, and if the content exceeds 10%, no further improvement in reactivity of the granulated product layer tends to be obtained, and an unnecessary amount of the specific metal element may be used. The content is particularly preferably from 0.1 to 2%.

The catalyst containing the specific metal element is preferably porous, but a non-porous catalyst may be used. The shape of the catalyst may be any of aggregates, needles and flakes. The mean particle diameter of the specific metal element component in the catalyst is preferably at most 0.1 $\mu$m so as to enlarge the specific surface area to increase the catalytic activity.

In the present invention, it is also preferred to further bring the specific halogen series gas into contact with an activated carbon layer in addition to the catalyst layer and the granulated product layer. In such a case also, the granulated product layer is located downstream the catalyst layer, however, the activated carbon layer may be located upstream the catalyst layer, between the catalyst layer and the granulated product layer, or downstream the granulated product layer. By disposing the activated carbon layer in addition to the catalyst layer and the granulated product layer and bringing the specific halogen series gas into contact therewith, load of the activated carbon layer can remarkably be reduced as compared with a case where a halogen element and a halogen compound are removed from the specific halogen series gas by the activated carbon layer alone, and generation of odor from the activated carbon layer can also be reduced.

(3) Addition of a Substance Containing the Specific Metal Element to the Granulated Product In the present invention, it is also preferred to mix a substance containing the specific metal element (hereinafter referred to as the specific metal-containing substance) to a powder of a hydrogencarbonate having a mean particle diameter of primary particles of from 10 to 500 $\mu$m, followed by granulation, and to bring the specific halogen series gas into contact with the obtained granulated product to remove the specific halogen series gas. The metal-containing substance may be a metal element, a metal compound or a mixture thereof.

By inclusion of the specific metal-containing substance in the granulated product, reactivity of the hydrogencarbonate can be improved, and the effect can be maintained for a long period of time. As a method of inclusion of the specific metal-containing substance into the granulated product, preferred is a method of mixing the specific metal-containing substance with the hydrogencarbonate, followed by granulation, The content of the specific metal-containing substance in the granulated product is preferably from 0.001 to 10 mass %. If the content is less than 0.001 mass %, no effect to improve the reactivity of the granulated product tends to be obtained, and if it exceeds 10 mass %, no further improvement in reactivity tends to be obtained, and an unnecessary amount of the specific metal-containing substance may be used, and further, the content of the hydrogencarbonate decreases, whereby the capacity to remove the halogen series gas tends to decrease. The content is particularly preferably from 0.005 to 5 mass %. As another material which may be contained in the granulated product, an adsorbent other than a hydrogencarbonate or a binder may, for example, be mentioned.

In the granulated product, in the same manner as mentioned above, the hydrogencarbonate reacts with a halogen element or a halogen compound to form a water-soluble salt, and the hydrogencarbonate itself is water-soluble, and accordingly most of the granulated product except for the specific metal-containing substance can be dissolved in water after used to remove the halogen series gas in an exhaust gas. The specific metal-containing substance can be recovered by filtration after the granulated product is dissolved in water.

By adding the specific metal-containing substance in the granulated product, the reactivity of the hydrogencarbonate with a halogen improves, and a larger amount of the halogen series gas can be removed when the same amount of the hydrogencarbonate is used. The mechanism also is not clearly understood similarly to the above-mentioned method of introducing the specific acid gas, but it is considered that the substance containing the above element accelerates decomposition of a hypohalogenous acid salt to be formed when the hydrogencarbonate reacts with $Cl_2$, $Br_2$ or $I_2$ contained in the halogen series gas. It is considered that by mixing a metal or a metal compound in the granulated product, a decomposition reaction of the hypohalogenous acid salt is accelerated, and the removal efficiency of the specific halogen series gas increases.

Now, the present invention will be described in further detail with reference to Examples and Comparative Examples. However, it should be understood that the present invention is by no means restricted to such specific Examples.

In each of the following Examples, the hardness (breaking strength) of the granulated product was measured by using Kiya Type Digital Hardness Meter KHT-20 Model, manufactured by Fujiwara Scientific Co., Ltd. Further, since the hardness differs depending upon the size of the particles, measurement was carried out with respect to particles having uniform particle diameters obtained by sieving.

The mean particle diameter was measured as follows. Standard sieves (inner diameter: 200 mm, wire mesh: stainless steel) having sieve openings of 3.35 mm, 2.80 mm, 2.36 mm, 2.00 mm, 1.70 mm and 1.00 mm, respectively, were overlaid on top of one another, a bottom tray was disposed at the basement, and 100 g of a granulated product of a powder of a hydrogencarbonate was sprinkled on the top thereof, followed by shaking by a Ro-Tap Sieve Shaker (290 horizontal revolutions and 165 Taps per minute motion) manufactured by Iida Seisakusho for 10 minutes. Then, a mass of oversize particles remaining on each standard sieve was measured, a cumulative mass of the oversize particles remaining on each of sieves having the respective sieve opening values was shown by a line graph, and the particle diameter when the cumulative mass of the oversize particles was 50% was taken as the mean particle diameter.

EXAMPLE 1

300 kg of a powder of sodium hydrogencarbonate for food additive (manufactured by Asahi Glass Company, Limited) having a mean particle diameter of primary particles of 91 $\mu$m was subjected to compression molding by using a roll press type compression molding machine (manufactured by Turbo Kogyo K.K., tradename: Roller Compactor WP model, roll outer diameter: 230 mm, roll width: 80 mm) and was operated under a linear load of 36.8 kN/cm to obtain a molded product of the powder of sodium hydrogencarbonate in a form of flakes. The obtained compression-molded flakes were coarsely crushed by a flake breaker which is a granulator with a rotary brade, installed at the outlet of the molding machine and then all passed through a rotary fine granulator with a mesh of 4.75 mm, which is a rotary grain size selector, installed at the down stream. Then, this molded product was subjected to a rotary sieving machine (manufactured by Turbo Kogyo K.K., tradename: Turbo-Screener TS model) to remove grains larger than 4.0 mm and smaller than 1.0 mm and a granulated product of a powder of sodium hydrogencarbonate having a mean particle diameter of 2.3 mm was obtained.

Further, the particle strength of the granulated product was measured by the above method of measuring hardness. Namely, the obtained granulated product having a mean particle diameter of 2.3 mm was sieved by sieves having sieve openings of 0.5 mm, 1.0 mm, 1.5 mm, 2.0 mm and 2.5 mm, and hardness of twenty particles was measured with respect to each particle size to obtain an average value, whereupon the average hardness of particles of at least 0.5 mm and less than 1.0 mm was 4 N, the average hardness of particles of at least 1.0 mm and less than 1.5 mm was 12 N, the average hardness of particles of at least 1.5 mm and less than 2.0 mm was 23 N, and the average hardness of particles of at least 2.0 mm was 63 N.

Then, 30 kg of the granulated product as packing was packed in a packed column made of stainless steel with a fluororesin lining having an inner diameter of 300 mm and a length of 1,300 mm, the base of which was made of a gas permeable sintered plate. As a gas to be treated, a gas having a compositional ratio of $BCl_3$:20 vol %, $Cl_2$:60 vol % and argon:20 vol % was injected from the bottom of the packed column at a flow rate of 200 cm$^3$/min at a temperature of 25°

C. under normal pressure (atmospheric pressure). The gas discharged from the upper portion of the packed column was analyzed, whereupon no $BCl_3$ was detected, and $Cl_2$ was at most 0.1 vol ppm.

After 361 hours had passed from the beginning of the treatment, the $Cl_2$ concentration in the discharged gas started to increase. The packing was taken out, whereupon no powdering of the granulated product particles nor generation of odor was confirmed. Further, the packing (the granulated product particles) was put in water, whereupon the entire packing was dissolved in water, and no solid waste product was formed.

EXAMPLE 2

The same operation as in Example 1 was carried out except that the granulated product of a powder of sodium hydrogencarbonate obtained in the same manner as in Example 1 and activated carbon in a total amount of 35 kg were packed in the same packed column as in Example 1 in such an order of 5 kg of activated carbon, 12.5 kg of the granulated product, 5 kg of activated carbon and 12.5 kg of the granulated product from the bottom, and the discharged gas was analyzed, whereupon no $BCl_3$ was detected, and $Cl_2$ was at most 0.1 vol ppm.

After 374 hours had passed from the beginning of the treatment, the $Cl_2$ concentration in the discharged gas started to increase. The packing was taken out, whereupon no powdering of the granulated product particles nor generation of odor was confirmed. Further, the granulated product in the packing was put in water, whereupon the entire granulated product was dissolved in water.

EXAMPLE 3

Comparative Example

The same operation as in Example 1 was carried out except that 35 kg of activated carbon alone was packed in the same packed column as in Example 1, and the discharged gas was analyzed, whereupon no $BCl_3$ was detected, and $Cl_2$ was at most 0.1 vol ppm.

After 251 hours had passed from the beginning of the treatment, the $Cl_2$ concentration in the discharged gas started to increase. The packing was taken out, whereupon a heavy odor of chlorine was confirmed from activated carbon. Further, the taken out activated carbon was treated as a solid waste.

EXAMPLE 4

Using the granulated product of a powder of sodium hydrogencarbonate obtained in the same manner as in Example 1, the same operation as in Example 1 was carried out except that the gas to be treated, heated to a temperature of 60° C., was injected from the bottom of the packed column under normal pressure, and the discharged gas from the upper portion of the packed column was analyzed, whereupon no $BCl_3$ was detected, and $Cl_2$ was at most 0.1 vol ppm.

After 361 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, this packing was put in water, whereupon the entire packing was dissolved in water, and no solid waste was formed.

EXAMPLE 5

The same operation as in Example 1 was carried out except that the packed column itself was heated by an electric heater to a temperature of 70° C. instead of heating the gas itself to 60° C. The discharged gas was analyzed in the same manner as in Example 1, whereupon no $BCl_3$ was detected, and the $Cl_2$ concentration was at most 0.1 vol ppm.

After 362 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the granulated product in the packing was put in water, whereupon the entire granulated product was dissolved in water.

EXAMPLE 6

20 kg of the granulated product of a powder of sodium hydrogencarbonate obtained in the same manner as in Example 1 and 10 kg of activated carbon were packed in the same packed column. The same operation as in Example 1 was carried out except that a gas having a compositional ratio in a normal state of $BCl_3$:20 vol %, $CCl_4$:0.6 vol %, $Cl_2$:41.1 vol %, $SiCl_4$:0.6 vol %, HCl:4.8 vol %, $COCl_2$:0.6 vol %, $F_2$:2.7 vol %, $SiF_4$:0.6 vol %, HF:4.8 vol %, $COF_2$:0.6 vol %, $NF_3$:0.8 vol %, $WF_6$:0.6 vol %, $ClF_3$:0.6 vol %, HBr:4.8 vol % and argon:20.0 vol %, was used as the gas to be treated, at a temperature of the gas to be treated of 60° C. The discharged gas was analyzed in the same manner as in Example 1, whereupon the $Cl_2$ concentration was at most 0.1 vol ppm, and no other components except for argon, such as $BCl_3$, $CCl_4$, $SiCl_4$, HCl, $COCl_2$, $F_2$, $SiF_4$, HF, $COF_2$, $NF_3$, $WF_6$, $ClF_3$ and HBr were detected.

After 301 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the granulated product in the packing was put in water, whereupon at least 90 mass % of the granulated product was dissolved in water.

EXAMPLE 7

The same operation as in Example 6 was carried out except that the temperature of the gas to be treated was 25° C. The discharged gas was analyzed in the same manner as in Example 6, whereupon the $Cl_2$ concentration was at most 0.1 vol ppm, and no other components except for argon, such as $BCl_3$, $CCl_4$, $SiCl_4$, HCl, $COCl_2$, $F_2$, $SiF_4$, HF, $COF_2$, $NF_3$, $WF_6$, $ClF_3$ and HBr were detected.

After 268 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the granulated product in the packing was put in water, whereupon at least 90 mass % of the granulated product was dissolved in water. Since the reaction efficiency of sodium hydrogencarbonate was poor as compared with Example 6, the effective time of sodium hydrogencarbonate was short.

EXAMPLE 8

Comparative Example

The same operation as in Example 6 was carried out except that activated carbon was used instead of sodium hydrogencarbonate. The discharged gas was analyzed in the same manner as in Example 6, whereupon the $Cl_2$ concentration was at most 0.1 vol ppm, and no other components except for argon, such as $BCl_3$, $CCl_4$, $SiCl_4$, HCl, $COCl_2$, $F_2$, $SiF_4$, HF, $COF_2$, $NF_3$, $WF_6$, $ClF_3$ and HBr were detected.

After 184 hours had passed from the beginning of the treatment, the $Cl_2$ concentration in the discharged gas started to increase to exceed 0.1 vol ppm. The packing was taken out, whereupon no powdering of the activated carbon particles was confirmed, but generation of heavy odor of chlorine was confirmed.

EXAMPLE 9

25 kg of a powder of sodium hydrogencarbonate for food additive (manufactured by Asahi Glass Company, Limited) having a mean particle diameter of primary particles of 56 μm was put in a kneader (tradename: Batch Kneader model KDHJ-100, manufactured by Fuji Paudal Co., Ltd.), and 3.75 kg of a 2 mass % aqueous solution of carboxymethylcellulose for food additive (tradename: F-20, manufactured by Nichirin Kagaku Kogyo K.K.) as a binder was sprayed thereon by a spray. The kneaded product was subjected to granulation by using a vertical type disc-die roll type disc pelleter (tradename: Disc Pelleter model F-40, manufactured by Fuji Paudal Co. Ltd.). The obtained granulated product was sized by a spherical particle sizer (tradename: MARUMERIZER model Q-400, manufactured by Fuji Paudal Co., Ltd.) into spheres to obtain a spherical granulated product. Then, this granulated product was left to stand in a carbon dioxide gas atmosphere at a temperature of 60° C. for 12 hours for drying.

The obtained granulated product was sieved by a sieve having a sieve opening of 5.6 mm, and the particles which passed through the sieve were further sieved by a sieve having a sieve opening of 2.8 mm, to obtain 12 kg of a spherical granulated product having a mean particle diameter of 4.4 mm. This operation was carried out three times in total to obtain 30 kg of a spherical granulated product.

By the same method for measuring hardness as in Example 1, hardness of twenty particles of the granulated product was measured to obtain an average value, whereupon the average hardness of particles having particle sizes of at least 2.0 mm was 56 N.

The same operation as in Example 1 was carried out except that 30 kg of the spherical granulated product having particle sizes of at least 2.0 mm was used as the packing.

The gas which was discharged from the upper portion of the packed column was analyzed, whereupon no $BCl_3$ was detected, and the $Cl_2$ concentration was at most 0.1 vol ppm.

After 359 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the packing was put in water, whereupon the entire packing was dissolved in water, and no solid waste product was formed.

EXAMPLE 10

30 kg of the granulated product obtained in the same manner as in Example 1 was packed in the same packed column as in Example 1. A mixed gas having a compositional ratio of $Cl_2$:80 vol % and argon:20 vol % was injected from the bottom of the packed column at a flow rate of 200 cm³/min at a temperature of 25° C. under normal pressure, and further, 100 vol % of HCl gas was simultaneously injected from the bottom of the packed column at 40 cm³/min. The gas which was discharged from the upper portion of the packed column was analyzed, whereupon the $Cl_2$ concentration was at most 0.1 vol ppm.

After 364 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the packing was put in water, whereupon the entire packing was dissolved in water, and no solid waste product was formed.

EXAMPLE 11

Comparative Example

The same operation as in Example 10 was carried out except that no HCl gas was injected. The discharged gas was analyzed in the same manner as in Example 10, whereupon the $Cl_2$ concentration was at most 0.1 vol ppm.

After 266 hours had passed from the beginning of the treatment, the $Cl_2$ concentration in the discharged gas started to increase to exceed 0.1 vol ppm. The packing was taken out at this point, whereupon no powdering of the granulated product particles nor generation of odor was confirmed. Further, the packing was put in water, whereupon the entire packing was dissolved in water, and no solid waste product was formed.

EXAMPLE 12

Comparative Example

The same operation as in Example 10 was carried out except that 30 kg of activated carbon was used instead of 30 kg of the granulated product of a powder of sodium hydrogencarbonate. The discharged gas was analyzed in the same manner as in Example 10, whereupon the $Cl_2$ concentration was at most 0.1 vol ppm.

After 207 hours had passed from the beginning of the treatment, the $Cl_2$ concentration in the discharged gas started to increase to exceed 0.1 vol ppm. The packing was taken out at this point, whereupon no powdering of activated carbon was confirmed, but generation of heavy odor of chlorine was confirmed.

EXAMPLE 13

A granulated product was obtained in the same manner as in Example 1, then 2 kg of activated carbon having 0.01% of palladium catalyst supported thereon as a packing was packed in the same packed column as in Example 1, and 30 kg of the above granulated product was packed thereon. A mixed gas having a compositional ratio of $BCl_3$:20 vol %, $Cl_2$:60 vol % and argon:20 vol % was injected from the bottom of the packed column at a flow rate of 200 cm³/min at a temperature of 25° C. under normal pressure. The gas which was discharged from the upper portion of the packed column was analyzed, whereupon no $BCl_3$ was detected, and the $Cl_2$ concentration was at most 0.1 vol ppm.

After 364 hours had passed from the beginning of the treatment, the $Cl_2$ concentration in the discharged gas started to increase to exceed 0.1 vol ppm. The granulated product was taken out at this point, whereupon no powdering of the granulated product particles nor generation of odor was confirmed. Further, the granulated product was put in water, whereupon the entire granulated product was dissolved in water, and no solid waste product was formed.

EXAMPLE 14

Comparative Example

The same operation as in Example 13 was carried out except that no activated carbon having a palladium catalyst supported thereon was packed. The discharged gas was analyzed in the same manner as in Example 13, whereupon no $BCl_3$ was detected, and the $Cl_2$ concentration was at most 0.1 vol ppm.

After 310 hours had passed from the beginning of the treatment, the $Cl_2$ concentration in the discharged gas started to increase to exceed 0.1 vol ppm. The granulated product was taken out at this point, whereupon no powdering of the granulated product particles nor generation of odor was confirmed. Further, the granulated product was put in water, whereupon the entire granulated product was dissolved in water, and no solid waste product was formed.

EXAMPLE 15

0.03 kg of palladium oxide was mixed with 299.97 kg of the same powder of sodium hydrogencarbonate as in Example 1, followed by the same compression molding as in Example 1 to obtain a molded product of the powder of sodium hydrogencarbonate in a form of flakes. The obtained compression-molded flakes was coarsely crushed by a flake breaker, and then all passed through a rotary fine granulator with a mesh of 4.75 mm. Then, this molded product was subjected to a rotary sieving machine to remove grains larger than 4.0 mm and smaller than 1.0 mm and a granulated product of the powder of sodium hydrogencarbonate having a mean particle diameter of 2.3 mm was obtained.

Further, in the same manner as in Example 1, the particle strength of the granulated product was measured, and the hardness of twenty particles was measured with respect to each particle size after sieving to obtain an average value, whereupon the average hardness of particles of at least 0.5 mm and less than 1.0 mm was 3 N, the average hardness of particles of at least 1.0 mm and less than 1.5 mm was 11 N, the average hardness of particles of at least 1.5 mm and less than 2.0 mm was 18 N, and the average hardness of particles of at least 2.0 mm was 58 N.

Then, 30 kg of the granulated product as a packing was packed in the same packed column as in Example 1. As the gas to be treated, a gas having a compositional ratio in a normal state of $BCl_3$:20 vol %, $Cl_2$:60 vol % and argon:20 vol % was injected from the bottom of the packed column at a flow rate of 200 cm$^3$/min at a temperature of 25° C. under normal pressure. The gas which was discharged from the upper portion of the packed column was analyzed, whereupon no $BCl_3$ was detected, and the $Cl_2$ concentration was at most 0.1 vol ppm.

After 362 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the packing was put in water, whereupon most of it was dissolved in water, and a solid waste product could be reduced. Further, the palladium oxide which is expensive could be recovered by filtration of the liquid having the packing dissolved therein.

EXAMPLE 16

The same operation as in Example 15 was carried out except that 299.7 kg of sodium hydrogencarbonate was used and 0.3 kg of nickel oxide was used instead of 0.03 kg of palladium oxide. The discharged gas was analyzed in the same manner as in Example 15, whereupon no $BCl_3$ was detected, and the $Cl_2$ concentration was at most 0.1 vol ppm.

After 356 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed.

Further, the packing was put in water, whereupon most of it was dissolved in water, and a solid waste product could be reduced. Further, nickel oxide could be recovered by filtration of the liquid having the packing dissolved therein.

EXAMPLE 17

The same operation as in Example 15 was carried out except that the amounts of sodium hydrogencarbonate and the metal oxide were 297 kg and 3 kg, respectively. As the metal oxide, the operation was carried out with respect to iron oxide, cobalt oxide, manganese dioxide and copper oxide. The discharged gas was analyzed in the same manner as in Example 1, whereupon no $BCl_3$ was detected in each gas, and the $Cl_2$ concentration was at most 0.1 vol ppm.

After 351 hours had passed from the beginning of the treatment with respect to iron oxide, 349 hours with respect to cobalt oxide, 355 hours with respect to manganese dioxide, and 352 hours with respect to copper oxide, the $Cl_2$ concentration in the discharged gas started to increase to exceed 0.1 vol ppm. The packing was taken out, whereupon no powdering of the granulated product particles nor generation of odor was confirmed. Further, the packing was put in water, whereupon most of it was dissolved in water, and a solid waste product could be reduced. Further, each metal oxide could be recovered by filtration of the liquid having the packing dissolved therein.

EXAMPLE 18

20 kg of a granulated product of a mixture comprising a powder of sodium hydrogencarbonate and palladium oxide obtained in the same manner as in Example 15 and 20 kg of activated carbon were packed in the same packed column in the same manner as in Example 15. The discharged gas was analyzed in the same manner as in Example 15 except that as the gas to be treated, a gas having a compositional ratio in a standard state of $BCl_3$: 20 vol %, $CCl_4$:0.6 vol %, $Cl_2$:41.1 vol %, $SiCl_4$:0.6 vol %, HCl:4.8 vol %, $COCl_2$:0.6 vol %, $F_2$:2.7 vol %, $SiF_4$:0.6 vol %, HF:4.8 vol %, $COF_2$:0.6 vol %, $NF_3$:0.8 vol %, $WF_6$: 0.6 vol %, $ClF_3$:0.6 vol %, HBr:4.8 vol % and argon:20.0 vol %, was used, whereupon the $Cl_2$ concentration was at most 0.1 vol ppm, and no other components except for argon, such as $BCl_3$, $CCl_4$, $SiCl_4$, HCl, $COCl_2$, $F_2$, $SiF_4$, HF, $COF_2$, $NF_3$, $WF_6$, $ClF_3$ and HBr were detected.

After 300 hours had passed from the beginning of the treatment, the $Cl_2$ concentration in the discharged gas started to increase to exceed 0.1 vol ppm. The packing was taken out, whereupon no powdering of the granulated product particles nor generation of odor was confirmed. Further, the granulated product in the packing was put in water, whereupon at least 90 mass % thereof was dissolved in water.

The entire disclosures of Japanese Patent Application No. 2000-343696 filed on Nov. 10, 2000, Japanese Patent Application No. 2001-124231 filed on Apr. 23, 2001, Japanese Patent Application No. 2001-124232 filed on Apr. 23, 2001, Japanese Patent Application No. 2001-202977 filed on Jul. 4, 2001 and Japanese Patent Application No. 2001-198649 filed on Jun. 29, 2001 including specifications, claims and summaries are incorporated herein by reference in their entireties.

What is claimed is:

1. A method for removing a halogen series gas, which comprises bringing a halogen series gas comprising a halogen element or a halogen compound into contact with a granulated product, wherein the granulated product is obtained by granulating a powder of a hydrogencarbonate having a mean particle diameter of primary particles of from 10 to 500 μm, and has a mean particle diameter of from 0.5 to 20 mm and an average hardness as defined below:

in a case where the granulated product has a mean particle diameter of at least 0.5 mm and less than 1.0 mm, the average hardness of granulated product particles having particle diameters of at least 0.5 mm and less than 1.0 mm is at least 1 N;

in a case where the granulated product has a mean particle diameter of at least 1.0 mm and less than 1.5 mm, the average hardness of granulated product particles having particle diameters of at least 1.0 mm and less than 1.5 mm is at least 4 N;

in a case where the granulated product has a mean particle diameter of at least 1.5 mm and less than 2.0 mm, the average hardness of granulated product particles having particle diameters of at least 1.5 mm and less than 2.0 mm is at least 10 N; and in a case where the granulated product has a mean particle diameter of from 2.0 mm to 20 mm, the average hardness of granulated product particles having particle diameters of at least 2.0 mm is at least 30 N.

2. The method for removing a halogen series gas according to claim 1, wherein the mean particle diameter of the granulated product is from 0.5 to 10 mm.

3. The method for removing a halogen series gas according to claim 1, wherein the granulated product is obtained by compression molding.

4. The method for removing a halogen series gas according to claim 1, wherein the halogen series gas is brought into contact with the granulated product at a temperature of at least 40° C. and less than 80° C. to remove the halogen series gas.

5. The method for removing a halogen series gas according to claim 4, wherein the halogen series gas is brought into contact with the granulated product at a temperature of at least 50° C. and less than 70° C. to remove the halogen series gas.

6. The method for removing a halogen series gas according to claim 1, wherein the granulated product is packed in a container together with activated carbon and the halogen series gas is brought into contact therewith to remove the halogen series gas.

7. The method for removing a halogen series gas according to claim 1, wherein the halogen series gas contains at least one member selected from the group consisting of $BCl_3$, $CCl_4$, $Cl_2$, $Br_2$, $I_2$, $SiCl_4$, HCl, $COCl_2$, $F_2$, $SiF_4$, HF, $COF_2$, $NF_3$, $WF_6$, $ClF_3$ and HBr.

8. The method for removing a halogen series gas according to claim 1, wherein the halogen series gas is a halogen series gas containing at least one member selected from the group consisting of $Cl_2$, $Br_2$ and $I_2$, which is brought into contact with the granulated product to remove the halogen series gas, and at least one acid gas selected from the group consisting of hydrogen chloride, hydrogen fluoride, hydrogen bromide and hydrogen iodide is added in an amount of from 1 to 100 vol % based on the halogen series gas.

9. The method for removing a halogen series gas according to claim 8, wherein the above at least one acid gas selected from the group consisting of hydrogen chloride, hydrogen fluoride, hydrogen bromide and hydrogen iodide is added in an amount of from 1 to 80 vol % based on the halogen series gas.

10. The method for removing a halogen series gas according to claim 1, wherein the halogen series gas is a halogen series gas containing at least one member selected from the group consisting of $Cl_2$, $Br_2$ and $I_2$, and the halogen series gas is brought into contact with a catalyst layer containing at least one element selected from the group consisting of Pd, Fe, Ni, Co, Mn and Cu, and then brought into contact with a layer consisting of the granulated product, to remove the halogen series gas.

11. The method for removing a halogen series gas according to claim 10, wherein the content of the above at least one element selected from the group consisting of Pd, Fe, Ni, Co, Mn and Cu in the catalyst layer is from 0.0001 to 10%.

12. The method for removing a halogen series gas according to claim 10, wherein the content of the above at least one element selected from the group consisting of Pd, Fe, Ni, Co, Mn and Cu in the catalyst layer is from 0.1 to 2%.

13. The method for removing a halogen series gas according to claim 1, wherein the halogen series gas is a halogen series gas containing at least one member selected from the group consisting of $Cl_2$, $Br_2$ and $I_2$, the granulated product is obtained by granulation by adding a substance containing at least one element selected from the group consisting of Pd, Fe, Ni, Co, Mn and Cu, and the halogen series gas is brought into contact with the granulated product to remove the halogen series gas.

14. The method for removing a halogen series gas according to claim 13, wherein the granulated product contains the substance containing at least one element selected from the group consisting of Pd, Fe, Ni, Co, Mn and Cu in an amount of from 0.001 to 10 mass %.

15. The method for removing a halogen series gas according to claim 13, wherein the granulated product contains the substance containing at least one element selected from the group consisting of Pd, Fe, Ni, Co, Mn and Cu in an amount of from 0.005 to 5 mass %.

16. The method for removing a halogen series gas according to claim 1, wherein the halogen series gas is a halogen series gas containing at least one member selected from the group consisting of $Cl_2$, $Br_2$ and $I_2$, and contains at least one member selected from the group consisting of $BCl_3$, $CCl_4$, $SiCl_4$, HCl, $COCl_2$, $SiF_4$, HF, $F_2$, $COF_2$, $NF_3$, $WF_6$, $ClF_3$ and HBr.

17. The method for removing a halogen series gas according to claim 1, wherein the hydrogencarbonate is sodium hydrogencarbonate.

18. The method for removing a halogen series gas according to claim 17, wherein the granulated product contains sodium hydrogencarbonate in an amount of at least 70 mass %.

* * * * *